United States Patent [19]

Shovlin

[11] Patent Number: 4,774,850

[45] Date of Patent: Oct. 4, 1988

[54] GEAR SHIFTER CARTRIDGE

[75] Inventor: William D. Shovlin, Mt. Clemens, Mich.

[73] Assignee: Regal Plastics Company, Roseville, Mich.

[21] Appl. No.: 88,593

[22] Filed: Aug. 24, 1987

[51] Int. Cl.⁴ .......................... G05G 1/06; G05G 5/06; G05G 9/18

[52] U.S. Cl. ...................................... 74/475; 74/110; 74/473 R; 74/538

[58] Field of Search ..................... 74/110, 473 R, 475, 74/538

[56] References Cited

U.S. PATENT DOCUMENTS 3,998,109 12/1976 O'Brien ............................. 74/538 X
4,513,276 4/1985 Kubota et al. ..................... 74/475 X
4,565,151 1/1986 Buma ................................ 74/475 X

FOREIGN PATENT DOCUMENTS 59-172024 9/1984 Japan ..................................... 74/538

Primary Examiner—Allan D. Herrmann
Attorney, Agent, or Firm—Krass & Young

[57] ABSTRACT

An actuator mechanism for preconditioning a gearshift mechanism for movement into a selected gear such as low, reverse, or park. The actuator mechanism is in cartridge form so as to fit a wide variety of gearshift knob designs and sizes and the mechanism is arranged such that the pushbutton plunger assembly for preconditioning the transmission is moved to its retracted position by the spring of the actuator mechanism and is maintained in its extended position by the shift link of the shift lever.

20 Claims, 2 Drawing Sheets

GEAR SHIFTER CARTRIDGE

BACKGROUND OF THE INVENTION

This invention relates to gear shifter handle assemblies and more particularly to gear shifter handle assemblies having provision to precondition the shift mechanism for movement into selected gears.

It is important that a preconditioning operation be performed before attempting to move a gear shift lever into certain gears in order to avoid clashing of the gears. For example, it is common practice to provide a preconditioning actuator mechanism on the gear shifter handle assembly which must be actuated prior to moving the transmission into reverse gear, low gear, or park. While the prior art actuator mechanisms for accomplishing the preconditioning of the transmission are generally satisfactory, they tend to have somewhat of a sloppy or imprecise feel and tend to be noisy, with the result that an aura of cheapness or imprecision is imparted to the entire transmission shift assembly. Further, the prior art preconditioning actuator mechanisms have required a separate design for each gearshift handle assembly, thereby increasing the cost of the preconditioning actuator mechanisms and increasing both OEN and aftermarket inventory requirements with respect to these mechanisms.

SUMMARY OF THE INVENTION

This invention is directed to the provision of a gearshift handle assembly in which the preconditioning actuator mechanism imparts a feel of precision and quality to the overall gearshift assembly.

This invention is further directed to the provision of a gearshift handle assembly in which the preconditioning actuator mechanism is in cartridge form so as to be interchangeably employed with a wide variety of gearshift handle profiles.

The invention preconditioning actuator mechanism is designed for use with a gear shifter handle of the type including a main body portion, including an elongated cavity opening at one end of the main body portion, and a hub portion extending at an angle to the main body portion and adapted to receive the free end of a transmission shift lever with a shift link, telescopically received within the shift lever, projecting upwardly at its free end into the cavity of the main body portion. The shift link is moved telescopically within the shift lever to precondition the shift mechanism for movement, for example, into low, reverse, or park.

The actuator mechanism according to the invention includes a plunger assembly slidably received in the handle cavity and receiving a button member projecting out of the open end of the cavity for pushing access by an operator; means operative in response to movement of the plunger assembly into the cavity to move the shift link in a direction out of the cavity to thereby precondition the transmission; and spring means urging the plunger assembly into the cavity. With this arrangement, internal spring means associated with the lower end of the shift link normally maintain the plunger assembly in an outwardly projecting position and the plunger is moved inwardly under the combined force of operator pressure and the actuator mechanism spring means so that when the spring means associated with the shift link is disassociated from the actuator assembly, the plunger assembly is held in its depressed position by the spring means of the actuator mechanism. This arrangement provides a precise, silken feel to the inward movement of the plunger assembly and provides a quiet, quality, controlled feel to the subsequent outward movement of the plunger assembly.

According to a further feature of the invention, the actuator assembly is in the form of a cartridge which includes a sleeve member sized to fit within the handle cavity and having a closed end adapted to be seated against the closed end of the cavity and an open end adapted to be positioned adjacent the open end of the cavity. The plunger assembly is slidably received in the sleeve and the spring means operates to urge the plunger assembly into the sleeve. This arrangement allows the actuator assembly to be produced as a self contained cartridge, with the advantages that the same basic cartridge may be used in a wide variety of handle members and the quality control of the overall gearshift assembly may be substantially improved.

According to a further feature of the invention, the spring means comprises a coil spring seated at its outboard end on an internal annular shoulder on the sleeve and seated at its inboard end on an external annular flange on the plunger adjacent the inboard end of the plunger. This arrangement provides a convenient and compact means for allowing the spring to constantly urge the plunger into the sleeve.

In the disclosed embodiment of the invention, the means for moving the shift link out of the handle cavity in response to inward movement of the plunger assembly includes a cam face on the plunger and a lever pivotally mounted at its inboard end on the closed end of the sleeve and slidably engaging the cam face and the free end of the shift link at its outboard end. This arrangement provides a convenient and effective means for moving the shift link out of the cavity in response to inward movement of the plunger assembly.

DETAILED DESCRIPTION OF THE PREFERRED EMBODIMENT

Figure 1:
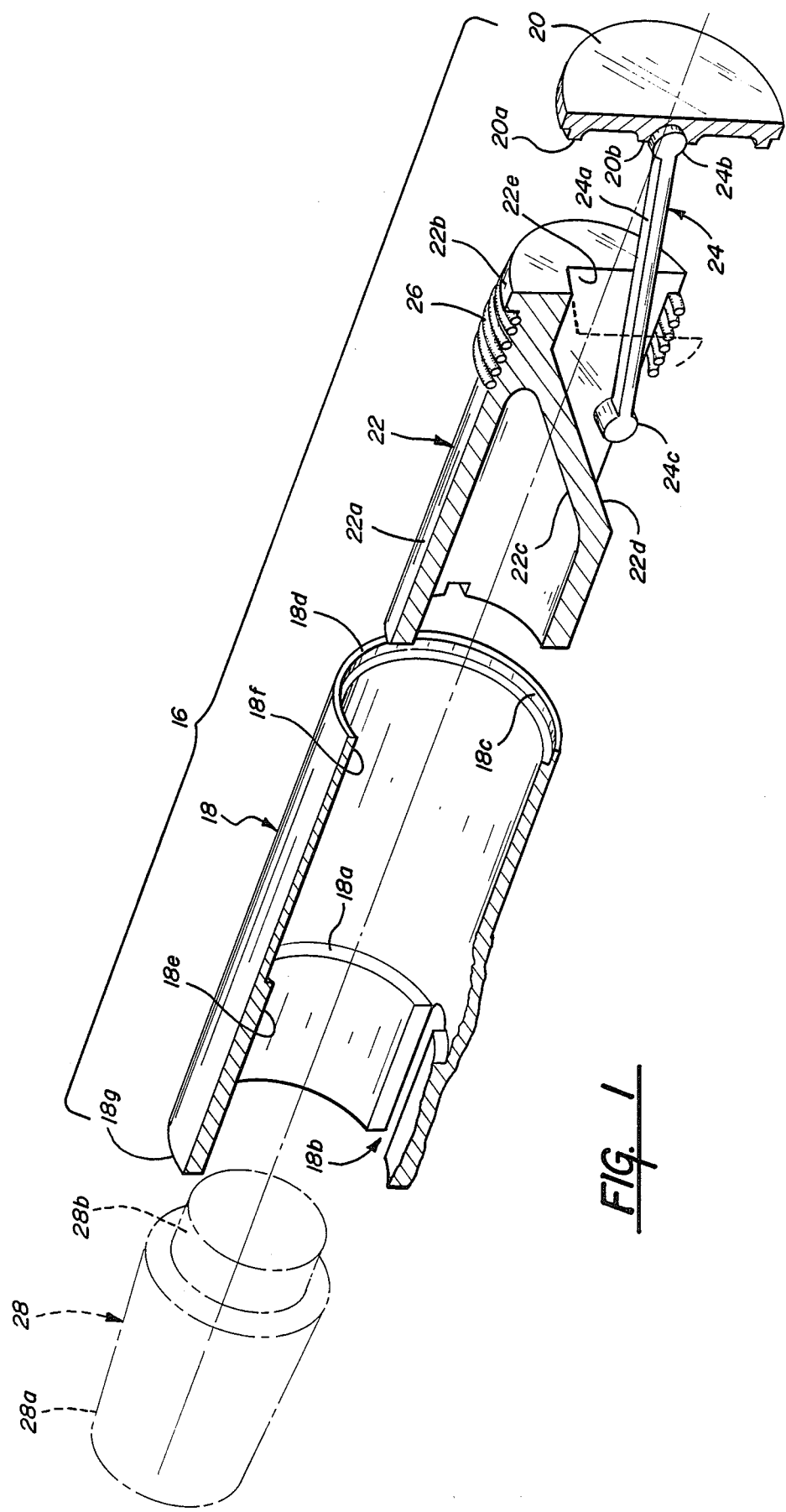
FIG. 1 is a perspective exploded view of the actuator mechanism or cartridge according to the invention.

The actuator mechanism of the invention is provided in the form of a cartridge and is adapted for use with a gear shifter handle 10 of the type including a main body portion 10a and a hub portion 10b.

Main body handle portion 10a includes an elongated cavity 10c opening at the outboard end 10d of the body portion and closed at the inboard end of the body portion by an end wall 10e. Hub portion 10b extends downwardly from the main body portion 10a and defines a central bore 10f for mounting receipt of the upper end of a gearshift lever 12 connected in known manner with the transmission of the associated vehicle. A shift link or swizzle stick 14 is received telescopically within the shift lever 12 and extends upwardly into the cavity 10c of main body handle portion 10a to position a head portion 14a on the upper end of shift link 14 within the cavity 10c. Shift link 14 is moved up and down in known manner to precondition the transmission for shifting into selected gears such as park, low or reverse.

Figure 2:
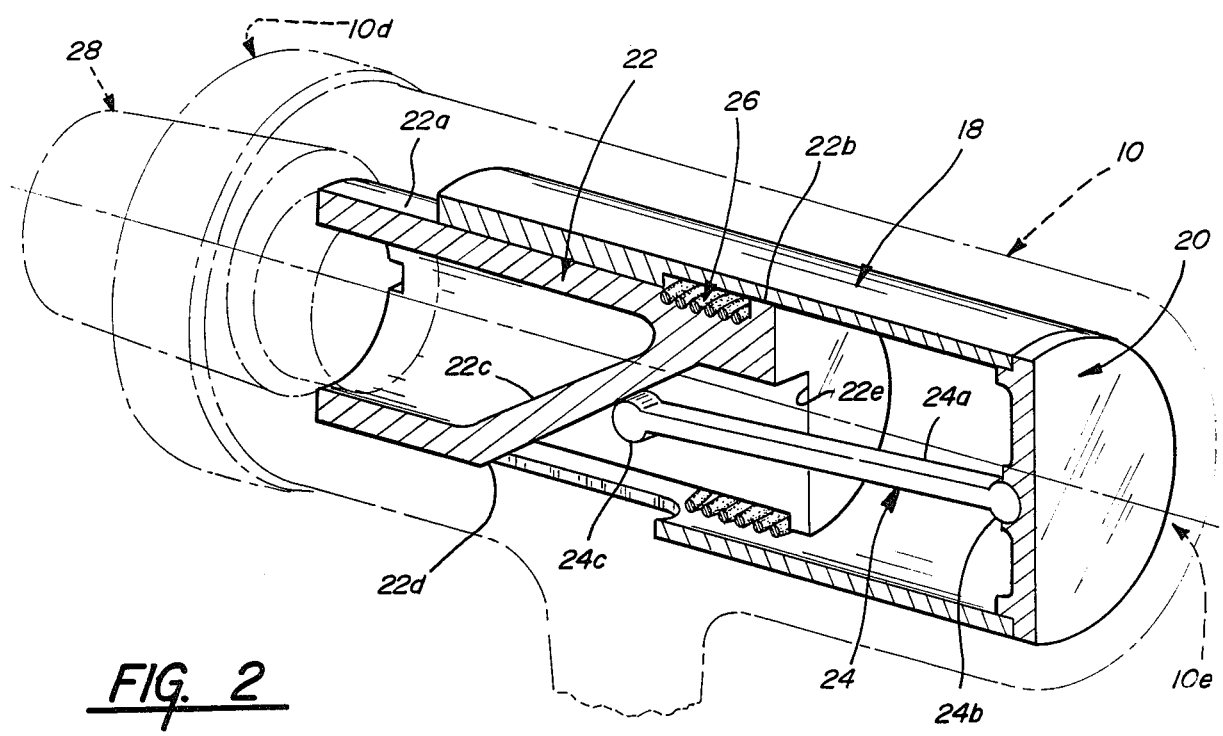
FIG. 2 is a cross sectional perspective view showing the cartridge of FIG. 1 in assembled relation within a gear shifter handle.
Figure 3:
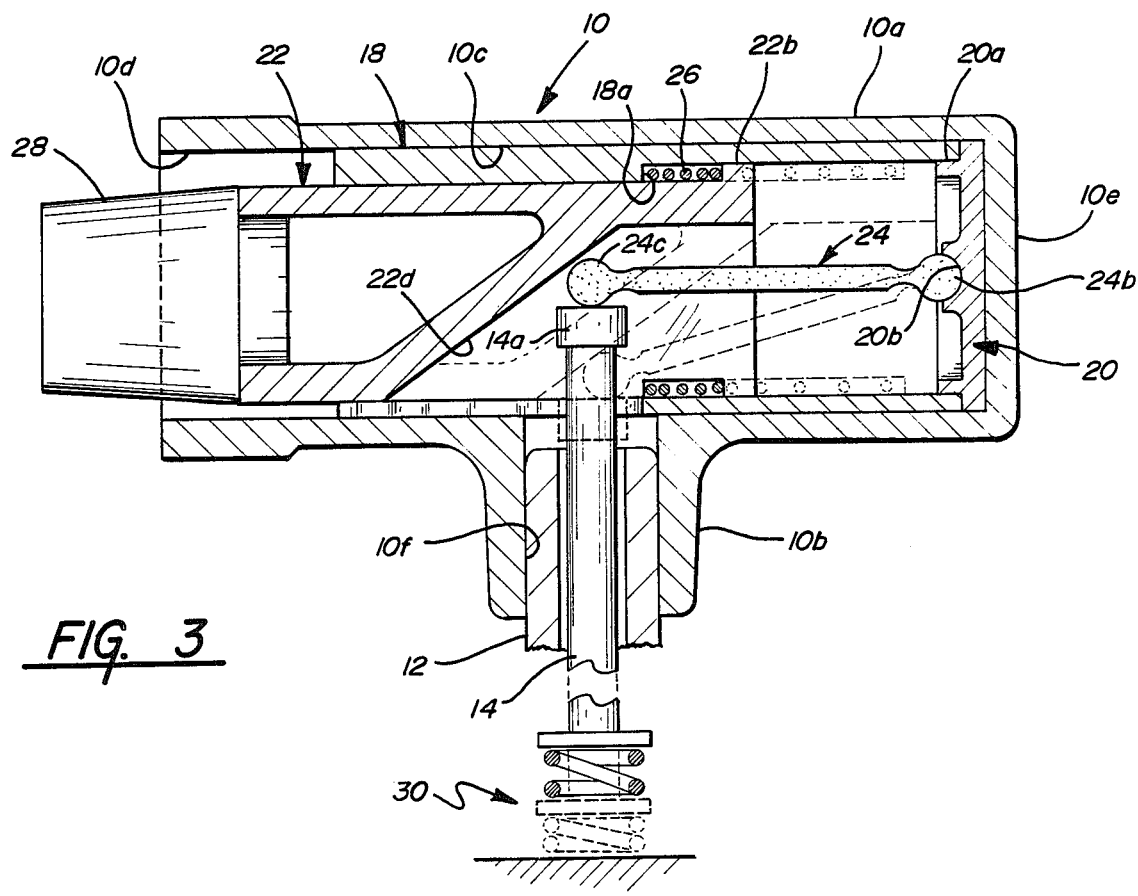
FIG. 3 is a cross sectional view showing the gear shifter handle assembly in assembled relation with a gearshift lever.

The actuator assembly or cartridge of the invention, generally designated 16, is seen in exploded form in FIG. 1 and in assembled relation within the shifter handle in FIGS. 2 and 3.

Cartridge 16 includes a sleeve member 18, an end cap 20, a plunger 22, a lever 24 and a spring member 26.

Sleeve 18 is formed of a suitable plastic material and includes an internal annular shoulder 18a, a slot 18b extending axially from the outboard end 18c of the sleeve to internal annular shoulder 18a, and an internal annular seat 18c formed at the inboard end 18c of the sleeve.

End cap 20 is also formed of a suitable plastic material and is adapted to close the inboard end 18c of the sleeve with an annular rib 20a on the end cap seating in seat 18c of the sleeve.

Plunger 22 is formed of a suitable plastic material and is slideably received within sleeve 18. Specifically, plunger 22 includes a main body cylindrical portion 22a sized to fit slideably within the relatively small diameter internal periphery 18e of the sleeve extending between shoulder 18a and outboard sleeve end 18a, and a flange portion 22b at the inboard end of the plunger sized to fit slideably in the relatively large diameter internal periphery 18f of the sleeve extending between the shoulder 18a and the inboard sleeve end 18d. Plunger 22 is hollow and includes an angled central partition portion 22c defining an angled ramp surface 22d at its inboard face. Plunger 22 further includes a slot 22e extending axially from the inboard end of the plunger to ramp surface 22d.

Lever 24 is formed of a plastic material and includes a elongated main body portion 24a, an inboard ball end 24b, and an outboard ball end 24c. Inboard ball end 24b is pivotally journalled in a socket 20b provided on the outboard face of end cap 20, and ball end 24c is adapted to slideably engage ramp surface 22d.

Spring 26 has a coil configuration and is sized to encircle plunger portion 22a and seat against plunger flange portion 22b.

A button 28 is provided for coaction with the invention cartridge and includes a main body portion 28a for pushing access by an operator and a seat portion 28b sized to fit telescopically within the open outboard end 18g of sleeve 18.

In assembled relation within the gear shifter handle, sleeve 18 is positioned snuggly and fixedly within handle cavity 10c with end cap 20 seated against the closed inboard end of the cavity, plunger 22 is slideably received within sleeve 18, button 28 is positioned within the open outboard end of the plunger, lever 24 extends between ramp surface 22d and socket 20b, and spring 26 is positioned between annular sleeve shoulder 18a and plunger flange 22b. Handle hub portion 10d is fitted over gearshift lever 12 and shift link 14 extends upwardly into the cavity of the handle through slot 18b. The ball end 24c of lever 24 slideably engages ramp surface 22d as well as the upper end of head 14a of the shift link.

It will be understood that shift link 14 is normally held in its upwardly extended position as seen in FIG. 3 by a schematically illustrated spring 30 within the transmission acting on the lower end of the shift link. The spring 30 urging the shift link upwardly is stronger than coil spring 26 so that the shift link normally has the effect of holding the plunger 22 in the extended position seen in FIG. 3 in which button 28 is accessible by an operator and in which spring 26 is compressed between flange 22b and shoulder 18a.

When it is desired to precondition the transmission for shifting into a gear such as low or reverse, the operator pushes on button 28 to depress plunger 22. As plunger 22 is depressed, ramp surface 22d presses against ball end 24c of lever 24 to cause lever 24 to pivot counterclockwise about the axis of socket 20b and cause shift link 14 to be moved downwardly to the dotted line position seen in FIG. 3. As the shift link arrives at the depressed dotted line position of FIG. 3, a detent mechanism within the transmission operates to allow shifting of the transmission to the desired low or reverse position and also disassociates spring 30 from the lower end of the shift link so that coil spring 26 now acts to hold the plunger in its depressed dotted line position as seen in FIG. 3 in which flange 22b is seated against rib 20a on end cap 20. Spring 26 maintains the plunger in its depressed position as the transmission is shifted into the desired low or reverse position and maintains the plunger in its depressed position until the shift lever is moved out of the low or reverse position, at which time spring 30 is again operatively associated with the lower end of the shift link and spring 26 controllably resists outward movement of the plunger against the upward force of spring 30 acting on the shift link to provide a smooth, quiet and positive return movement of the plunger to its extended solid line position of FIG. 3.

The invention actuator or cartridge assembly offers at least two important advantages as compared to similar prior art devices. Specifically, the invention provides a significantly more precise feel to the in and out movement of the plunger assembly because of the unique arrangement of the parts wherein the cartridge spring acts to drive the button to its retracted position where it is firmly and positively held until the transmission is subsequently moved out of the selected low or reverse gear, at which time the cartridge spring controllably resists the outward movement of the plunger so that the plunger is returned precisely, quietly, and positively to its extended position in a spring balanced operation rather than being snapped suddenly and noisily to its extended position under the combined force of the cartridge spring and the spring acting on the shift link.

Further, the cartridge construction of the invention enables the invention mechanism to be utilized with a wide variety of differing gear shift knob designs and configurations thereby eliminating the need to custom design an actuator assembly for each different gear shift knob environment and thereby greatly simplifying both OEM and aftermarket inventory requirements with respect to the actuator mechanisms.

The cartridge design also greatly improves quality control since the cartridges may be preassembled in a carefully controlled subassembly environment rather than individually custom fitting the various actuator assembly parts into the gear shifter handle on the main production line.

Whereas a preferred embodiment of the invention has been illustrated and described in detail, it will be apparent that various changes may be made in the disclosed embodiment without departing from the scope or spirit of the invention.

I claim:

1. An actuator mechanism for use with a gear shifter handle of the type including a main body portion, including an elongated cavity having a closed inboard end and an open outboard end, and a hub portion extending at an angle to the main body portion and adapted to receive the free end of a transmission shift lever with a shift link, telescopically received within the shift lever, projecting upwardingly into the handle cavity, said actuator mechanism including:
(A) a plunger assembly slidably received in the handle cavity and adapted to receive a button member for pushing access by an operator;
(B) means operative in response to movement of the plunger assembly into the cavity to move the shift link in a direction out of the cavity; and
(C) spring means urging said plunger assembly into the cavity.

2. An actuator mechanism according to claim 1 wherein:
(D) said plunger assembly includes a plunger positioned within the handle cavity; and
(E) said spring means includes a coil spring surrounding said plunger and urging said plunger into the cavity.

3. An actuator assembly mechanism according to claim 2 wherein:
(F) said actuator mechanism further includes a sleeve member sized to fit within the handle cavity and having a closed inboard end adapted to be seated against the closed inboard end of the cavity and an open outboard end adapted to be positioned adjacent the open outboard end of the cavity;
(G) said plunger is slidably received in said sleeve; and
(H) said spring extends between said sleeve and said plunger.

4. An actuator mechanism according to claim 3 wherein:
(I) said spring is seated at its outboard end on an internal annular shoulder on said sleeve and is seated on its inboard end on an external annular flange on the inboard end of said plunger.

5. An actuator mechanism according to claim 4 wherein:
(J) said operative means includes
(1) a cam face on said plunger, and
(2) a lever pivotally mounted at its inboard end on said closed inboard end of said sleeve and slidably engaging said cam face and the free end of the shift link at its outboard end.

6. A cartridge for use with a gear shift handle of the type including a main body portion, including an elongated cavity having a closed inboard end and an open outboard end and a substantially uniform cross-sectional configuration throughout its length, and a hub portion extending at an angle to the main body portion and adapted to receive the free end of a transmission shift lever with a shift link, telescopically received within the shift lever, projecting upwardly at its free end into the cavity, said cartridge comprising:
(A) a sleeve member having a substantially uniform external cross-sectional configuration throughout its length generally corresponding to that of said cavity so as to fit slidably into the handle cavity and having a closed inboard end adapted to be seated against the closed inboard end of the cavity and an open outboard end adapted to be positioned adjacent the open outboard end of the cavity;
(B) a plunger assembly slidably received in said sleeve and adapted to receive a button member for pushing access by an operator; and
(C) means operative in response to movement of said plunger assembly into said sleeve member to move the shift link in a direction out of the cavity.

7. A cartridge for use with a gear shift handle of the type including a main body portion, including an elongated cavity having a closed inboard end and an open outboard end, and a hub portion extending at an angle to the main body portion and adapted to receive the free end of a transmission shift lever with a shift link, telescopically received within the shift lever, projecting upwardly at its free end into the cavity, said cartridge comprising:
(A) a sleeve member sized to fit within the handle cavity and having a closed inboard end adapted to be seated against the closed inboard end of the cavity and an open outboard end adapted to be positioned adjacent the open outboard end of the cavity;
(B) a plunger assembly slidably received in said sleeve and adapted to receive a button member for pushing access by an operator;
(C) means operative in response to movement of said plunger assembly into said sleeve member to move the shift link in a direction out of the cavity; and
(D) spring means urging said plunger assembly into said sleeve.

8. A cartridge according to claim 7 wherein:
(E) said spring extends between said sleeve and said plunger.

9. A cartridge according to claim 8 wherein:
(F) said spring is seated at its outboard end on an internal annular shoulder on said sleeve and is seated on its inboard end on an external annular flange on said plunger adjacent the inboard end of said plunger.

10. A cartridge according to claim 9 wherein:
(G) said operative means includes
(1) a cam face on said plunger, and
(2) a lever pivotally mounted at its inboard end on said closed inboard end of said sleeve and slidably engaging said cam face and the free end of the shift link at its outboard end.

11. A gear shifter handle assembly including:
(A) a main body handle portion defining an elongated cavity closed at its inboard end and open at its outboard end;
(B) a hub handle portion extending at an angle to said main body portion and adapted to receive the free end of a transmission shift lever with a shift link, telescopically received within the shift lever, projecting upwardly at its free end into said cavity of said main body portion;
(C) a plunger assembly slidably received in said cavity and adapted to receive a button member for pushing access by an operator;
(D) means operative in response to movement of said plunger assembly into said cavity to move the shift link in a direction out of said cavity; and
(E) spring means urging said plunger assembly into said cavity.

12. A gearshift handle assembly according to claim 11 wherein:
(F) said plunger assembly includes a plunger positioned within said cavity; and
(G) said spring means includes a coil spring surrounding said plunger and urging said plunger into said cavity.

13. A gearshift handle assembly according to claim 12 wherein:
   (H) said gearshift handle assembly further includes a sleeve member sized to fit within said cavity and having a closed inboard end seating against the closed inboard end of said cavity and an open outboard end positioned adjacent the open outboard end of said cavity;
   (I) said plunger is slidably received in said sleeve; and
   (J) said spring extends between said sleeve and said plunger.

14. A gearshift handle assembly according to claim 13 wherein:
   (K) said spring is seated at its outboard end on an internal annular shoulder on said sleeve and is seated at its inboard end on an external annular flange on said plunger adjacent the inboard end of said plunger.

15. A gearshift handle assembly according to claim 14 wherein:
   (L) said operative means includes
      (1) a cam face on said plunger, and
      (2) a lever pivotally mounted at its inboard end on said closed inboard end of said sleeve and slidably engaging said cam face and the free end of the shift link at its outboard end.

16. In a transmission shift assembly of the type including a gear shifter handle including a main body portion defining an elongated cavity having a closed inboard end and an open outboard end, and a hub portion extending at an angle to the main body portion; a transmission shift lever received at its free upper end in the hub portion of the handle; a shift link telescopically received within the shift lever and projecting as its free upper end into the handle cavity; spring means urging said shift link upwardly; and an actuator mechanism for the shift assembly; the improvement wherein said actuator mechanism comprises:
   (A) a plunger assembly slidably received in said handle cavity and adapted to receive a button member for pushing access by an operator;
   (B) means operative in response to movement of said plunger assembly into said cavity to move said shift link in a direction downwardly out of said cavity against the resistance of said shift link spring means; and
   (C) actuator mechanism spring means urging said plunger assembly into said cavity with a force that is less than the shift link spring means force urging said plunger assembly out of said cavity.

17. A transmission shift assembly according to claim 16 wherein:
   (D) said plunger assembly includes a plunger positioned within said handle cavity; and
   (E) said actuator mechanism spring means includes a coil spring surrounding said plunger and urging said plunger into said cavity.

18. A transmission shift assembly according to claim 17 wherein:
   (F) said actuator mechanism further includes a sleeve member sized to fit within said handle cavity and having a closed inboard end adapted to be seated against said closed inboard end of said cavity and an open outboard end adapted to be positioned adjacent said open outboard end of said cavity;
   (G) said plunger is slidably received in said sleeve member; and
   (H) said actuator mechanism spring means extends between said sleeve member and said plunger.

19. A transmission shift assembly according to claim 18 wherein:
   (I) said actuator mechanism spring means is seated at its outboard end on an internal annular shoulder on said sleeve member and is seated at its inboard end on an external annular flange on the inboard end of said plunger.

20. A transmission shift assembly according to claim 19 wherein:
   (J) said operative means includes
      (1) a cam face on said plunger, and
      (2) a lever pivotally mounted at its inboard end on said closed inboard end of said sleeve member and slidably engaging said cam face on said plunger and the free upper end of said shift link.

* * * * *